UNITED STATES PATENT OFFICE 2,658,904

HALOTHENOYLGLYCINES

William Galler, Valley Stream, N. Y., assignor to American Cystoscope Makers, Inc., New York, N. Y., a corporation of New York No Drawing. Application March 22, 1950,
Serial No. 151,319

12 Claims. (Cl. 260—332.2)

This invention relates to halothenoylglycines.

An object of this invention is to provide new compositions which are useful in the radiography of the internal organs, particularly in the urological tract.

The compositions of this invention include water soluble salts which may be injected intravenously or subcutaneously and are collected by the kidney. The radiographs taken using such compounds in the urological tract reveal normal and abnormal structures. Because these water soluble salts contain in their molecule the substance with which the functional component of the salt would be conjugated if such functional component were administered alone, they are readily excreted without increasing the burden upon the kidney. Moreover, these compositions have no untoward effects on the patient. In addition to the utilization in the excretion radiography of the kidney, the water soluble salts may be used in making retrograde pyelographs; and because of this fact, they can be used for radiography of other hollow organs, such as the sinuses. They may be administered introvenously, subcutaneously or orally.

The compositions of this invention are halothenoylglycines which have either of the following structural formulas:

(1) 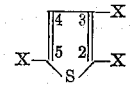

or (2) 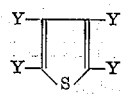

in which X is hydrogen, a halogen, such as fluorine, chlorine, bromine and iodine or the monovalent group —CONHCH$_2$COOM, at least one X being a halogen and at least one X being the monovalent group above defined. In the formula designated as (2) above, Y is a halogen or the monovalent group defined and at least one Y is a halogen and at least another Y is the monovalent group defined. The letter M in the defined monovalent group may be hydrogen, an alkali metal, the ammonium group, an alkylamino group or an alkanolamino group.

The starting materials for the production of the compositions of this invention may be prepared by either of two methods. They may be obtained, for example, by the oxidation of the corresponding halogenated methylthiophenes; or alternatively, they may be obtained by the oxidation of the corresponding acetylated halogenated thiophenes. By either method, the corresponding halothiophene carboxylic acids are obtained. These halothiophene carboxylic acids are then converted to the corresponding thenoylchloride by reacting with an acyl chlorinating agent, such as phosphorous trichloride, phosphorous pentachloride or thionyl chloride. However, thionyl chloride is preferred. The resulting halothenoyl chloride is then converted to the corresponding glycine by reacting the halothenoyl chloride desirably with an alkali metal salt of glycine, such as sodium glycinate in alkaline solution. If desired, the alkali metal salt may be readily converted into the corresponding acid by treatment with a non-oxidizing mineral acid, such as hydrochloric acid, or the corresponding alkylamine or alkanolamine salts may be produced by reacting the free halothenoylglycine acid with the appropriate amine.

The oxidation of the appropriate acetylated halogenated thiophene to the corresponding halothiophene carboxylic acid is preferably conducted in the presence of a solubilizing agent, such as dioxane, so that a high ratio of products to solvent exists. This ratio permits the operation to be conducted in an efficient manner and improves the yields.

The halothenoylglycines in acid form are relatively insoluble in water, while the halothenoylglycine in the form of the alkali metal, alkylamine and alkanolamine salts are relatively water soluble.

Examples of the halothenoylglycines are the following glycines or their alkali metal, ammonium, alkylamine or alkanolamine salts, such as their sodium, potassium, methyl amine, n-butyl amine or diethanol amine salts:

5-chloro-2-thenoylglycine
5-bromo-2-thenoylglycine
5-iodo-2-thenoylglycine
3,4,5-tribromo-2-thenoylglycine
2-chloro-3-thenoylglycine
5-chloro-3-thenoylglycine
2-bromo-3-thenoylglycine
5-bromo-3-thenoylglycine
2,5-dibromo-3-thenoylglycine
2,4,5-tribromo-3-thenoylglycine
2-iodo-thenoyl-3,5-diglycine
3,4-dibromo thenoyl-2,5-diglycine
5-iodothenoyl-2,3,4-triglycine
5-bromothenoyl-2,3-diglycine
3-bromo-2-thenoylglycine A more comprehensive understanding of this invention is obtained by reference to the following examples:

*Example 1.—5-iodo-2-thenoylglycine*

In a vessel fitted with reflux condenser, thermometer and agitator is placed a mixture of 273 grams of acetic anhydride and 105 grams of zinc chloride. 562 grams of 2-iodothiophene are then added, and the mixture is stirred and warmed until the temperature rises to 98° C. The reaction mixture, which contains 2-iodo-5-acetylthiophene, is then dissolved in ethanol, decolorized with charcoal and allowed to crystallize. Rather high yields of 2-iodo-5-acetylthiophene result from this process in high purity.

589 grams of sodium hydroxide are dissolved in 810 cc. of water, and 3375 grams of ice are added. 435 grams of chlorine gas are led into this cold solution, and to this resulting mixture 340 grams of 2-iodo-5-acetylthiophene are added. The suspension is stirred, and then 1850 grams of dioxane are added as a solubilizing agent. Stirring is continued for several hours until the temperature rises to about 60° C. The organic solvents are distilled off, and the reaction mixture is treated with sodium bisulfite, acidified, and the carboxylic acid is then filtered off. The 2-iodo-thiophene-5-carboxylic acid is produced in rather high yields of good purity.

2-iodo-5-thenoyl chloride is produced from the 2-iodo-thiophene-5-carboxylic acid by refluxing with an excess of thionyl chloride for about one-half hour. The excess thionyl chloride is removed by vacuum distillation, and the residue is reacted with an equimolecular proportion of glycine dissolved in two or three molar proportions of sodium hydroxide solution. The resulting reaction product is the sodium salt of 2-ido-5-thenoylglycine. If it is desired to produce other alkali metal salts or alkylamine or alkanolamine salts, the sodium salt 2-iodo-5-thenoylglycine may be first converted into the corresponding acid, and the acid is reacted with an alkali metal hydroxide, such as potassium hydroxide, or with an alkylamine, such as diethylamine or with an alkanolamine, such as diethanolamine. Other examples of alkylamines which produce the desired alkylamine salts are ethylamine, diethylamine and isopropylamine. Examples of alkanolamines which produce these salts are ethanolamine, diethanolamine and triethanolamine.

*Example 2.—2,4,5-tribromo-3-thenoylglycine*

2,4,5-tribromo-3-methylthiophene is oxidized with alkaline permanganate solution to form the sodium salt of 2,4,5-tribromothiophene-3-carboxylic acid. The free acid is isolated from the reaction mixture by precipitation with dilute hydrochloric acid after the manganese dioxide has been removed. The dry powdered acid is then refluxed with an excess of thionyl chloride, the excess thionyl chloride is removed by vacuum distillation, and the resulting viscous mass is mixed with a solution of glycine in excess caustic. After standing over night, the resulting 2,4,5-tribromo-3-thenoylglycine is separated from the reaction mixture by acidification with hydrochloric acid. The 2,4,5-tribromo-3-thenoylglycine is converted to the diethanolamine salt by reacting it in stoichiometric proportions with diethanolamine.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

What is claimed is:

1. A halothenoylglycine of the formula:

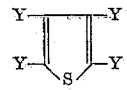

in which Y is a member selected from the class consisting of hydrogen, identical halogens and the monovalent groups:

in which M is a member selected from the class consisting of hydrogen, alkali metals, the ammonium group, alkyl ammonium groups and alkonolammonium groups; at least one Y being a halogen and at least another Y being said monovalent group.

2. Iodothenoylglycine.
3. Monoiodothenoylmonoglycine.
4. Alkanolamine salt of a tribromothenoylglycine.
5. 5-iodo-2-thenoylglycine.
6. The diethanol amine salt of 2,4,5-tribromo-3-thenoylglycine.
7. 5-halo-2-thenoylglycine.
8. Halo-2-thenoylglycine.
9. Monoiodo-2-thenoylglycine.
10. The sodium salt of 5-iodo-2-thenoylglycine.
11. The diethanolamine salt of 5-iodo-2-thenoylglycine.
12. The methylamine salt of 5-iodo-2-thenoylglycine.

WILLIAM GALLER.

References Cited in the file of this patent

UNITED STATES PATENTS

| Number | Name | Date |
|---|---|---|
| 2,135,474 | Sachs | Nov. 1, 1938 |

OTHER REFERENCES

Williams, Detoxication Mechanisms, pp. 194, 197, 198, Wiley, New York, 1947, R. S. 410 W. S.